United States Patent
Becker-Ross et al.

(10) Patent No.: US 6,717,670 B2
(45) Date of Patent: Apr. 6, 2004

(54) HIGH-RESOLUTION LITTROW SPECTROMETER AND METHOD FOR THE QUASI-SIMULTANEOUS DETERMINATION OF A WAVELENGTH AND A LINE PROFILE

(75) Inventors: Helmut Becker-Ross, Berlin (DE); Stefan Florek, Berlin (DE); Michael Okruss, Potsdam (DE)

(73) Assignees: Gesellschaft zur Förderung der Spektrochemie und angewandten Spectroskopie e.V., Dortmund (DE); Gesellschaft zur Förderung angewandter Optik, Optoelektronik, Quantenelektronik und Spektroskopie e.V., Berlin (DE)

( * ) Notice: Subject to any disclaimer, the term of this patent is extended or adjusted under 35 U.S.C. 154(b) by 5 days.

(21) Appl. No.: 10/168,314
(22) PCT Filed: Dec. 19, 2000
(86) PCT No.: PCT/EP00/12969
§ 371 (c)(1),
(2), (4) Date: Jun. 20, 2002
(87) PCT Pub. No.: WO01/46658
PCT Pub. Date: Jun. 28, 2001

(65) Prior Publication Data
US 2002/0180969 A1 Dec. 5, 2002

(30) Foreign Application Priority Data
Dec. 20, 1999 (DE) .......................... 199 61 908

(51) Int. Cl.[7] ................ G01J 3/18; G01J 3/22
(52) U.S. Cl. ......................... 356/328; 356/334
(58) Field of Search ................ 356/305, 326, 356/328, 334; 372/32

(56) References Cited

U.S. PATENT DOCUMENTS

| 2,922,331 A | 1/1960 | Fastie et al. |
| 3,472,595 A | 10/1969 | Hashizume |
| 4,398,823 A | 8/1983 | Brown et al. |

FOREIGN PATENT DOCUMENTS

JP 08-145795 A 6/1996

Primary Examiner—F. L. Evans
(74) Attorney, Agent, or Firm—James Creighton Wray; Meera P. Narasimhan (57) ABSTRACT

The invention relates to a spectrometer (10) with a dispersive element (16) that can be displaced between at least two positions. In the first position, the simply dispersed radiation (44) of a selected wavelength is reflected directly back in the incident beam path (42), while in the second position the dispersed radiation (32) of the selected wavelength can be directed to a reflective element (30) that is positioned such that the radiation (34) can be directed at least one more time across the dispersive element (16) and then back to the incident beam path (38). The spectrometer is provided with a device, for example, a mirror, an echelle grating or a prism that deflects the beam from the plane of dispersion, which is arranged in such a manner that the simply dispersed beam (34) runs in another plane than the multiply dispersed beam (36). The mirror (30) is inclined by an axis (54) that extends parallel to the plane of dispersion and perpendicular to the incident beam (32).

20 Claims, 8 Drawing Sheets

HIGH-RESOLUTION LITTROW SPECTROMETER AND METHOD FOR THE QUASI-SIMULTANEOUS DETERMINATION OF A WAVELENGTH AND A LINE PROFILE

This application claims the benefit of German Application No. 199 61 908.5 filed Dec. 20, 1999 and PCT/EP00/12969 filed Dec. 19, 2000.

BACKGROUND OF THE INVENTION

1. Technical Field

The invention relates to a spectrometer with a dispersing element, which is movable between at least two positions and where in the first position the radiation of a selected wavelength being dispersed once is reflected immediately into the incident light path.

The invention also relates to a method for measuring radiation from a spectral range with different spectral resolutions wherein the light beam is directed onto a dispersing element by an imaging optical system and from the dispersing element back to the imaging optical system. In particular the invention is related to the use of such spectrometers.

2. State of the Art

The spectrometers are also known as Littrow-spectrometers. In a Littrow arrangement the beam of a selected wavelength is at least approximately reflected into the incident light path after dispersion by a grating or a prism. Thereby the same optical components can be used as an imaging and camera optical system. A complete superposition of the incident and the dispersed beams is practically not possible, because a detector cannot be positioned in the entrance slit. A deviation is tolerable only for small angles, because the image detortions increase.

High resolution spectrometers with spectral bandwidths as small as 15 fm are used especially for measuring the spectral intensity distribution of lasers. Additionally to the spectral intensity distribution it can be desireable to determine the exact spectral position of the maximum of the intensity or of the line center. In order to achieve this an exact relationship between the position of the detectors or the picture points of the detector, respectively, and the respective wavelengths has to be determined.

Echelle-spectrometers are known, which comprise a grating with a stair-like cross-section. A diffraction pattern is generated by the stair-like structure with a suitable Blaze-angle, that concentrates the intensity in a very high order, for example in $80^{th}$ to $100^{th}$ order. These orders can overlap depending on the incident wavelengths.

In some of such Echelle-spectrometers the orders are dispersed once more perpendicular to the dispersion plane in order to separate the different occurring orders. In such a way a two-dimensional spectrum is obtained which can be detected with a linear or an array detector.

From the publication "Novel metrology for measuring spectral purity of KrF lasers for deep UV lithography" by A. I. Ershov, G. G. Padmabandu, J. Tyler, P. Palash, in http://www.cymer.com on 17.3.1999 furthermore Echelle-spectrometers for lasers are known in which a collimated beam in a Littrow arrangement is directed to a grating. In the Littrow-arrangement the beam of a certain wavelength is reflected with such an angle, that it overlaps at least approximately with the incident beam.

The dispersed beam is directed to the linear detector by means of a mirror. Between the collimator lens and the grating a partially transparent mirror is arranged. Thereby a portion of the light is reflected at the mirror after dispersion at the grating and again dispersed at the grating. The partially transparent mirror is arranged such that its normal forms a small angle with the beam. Thereby a small angular shift of the beams with single and plural dispersion is achieved so that the peaks can be found on different locations on the detector.

The known arrangement makes use of an intensity reducing partially transparent mirror through which also the beam which is once dispersed must pass twice. Accordingly, with several passages the intensity is reduced even more. For measuring with a single passage without such a reduction the partially transparent mirror has to be removed from the light path.

SUMMARY OF THE INVENTION

It is the object of the invention to provide a high resolution spectrometer which is suitable for determining the spectral distribution of the intensity of an emission line relative to the line center and also the absolute wavelength position of the line center with high accuracy and sensitivity.

According to the invention this object is achieved in that in the second position the dispersed radiation of the selected wavelength falls on a reflecting element which is arranged such that the radiation passes at least once more over the dispersing element and then into the incident light path.

In such an arrangement the dispersing element can be switched in a first turn such that the beam is immediately returned back. By changing the position, for example by simply rotating the dispersing element, the beam can also be directed to the reflecting element from which it is reflected back to the dispersing element. In this case the beam passes the dispersing element twice. Accordingly a higher spectral resolution is achieved. As the beam is not divided a good signal-to-noise-ratio is maintained even with a plurality of passages. Only reflection and efficiency losses at the reflecting and dispersing element will reduce the intensity.

In order to separate the radiation according to the amount of passages means for deviating the beam from the dispersing plane can be provided. They are chosen such that the single-dispersion beam runs in a different plane than the multiple-dispersion beam. A mirror which is inclined about an axis which is parallel to the dispersion plane and perpendicular to the incident beam is particularity suitable for this purpose. However, the deviation can be achieved by a prism also.

In a preferred embodiment the dispersing element is a grating, which in a especially preferred embodiment is an Echelle-grating. Preferably the Blaze-angle of the Echelle-grating is at least 45°. Then the measurements operate in a high order with a large incident angle, whereby a high resolution is achieved according to the diffraction equation.

An Echelle spectrometer according to the invention in which the positions of the grating are determined by the angle relative to the incident beam has the advantage that both positions can be achieved by a simple rotation of the grating. The rotational axis is the same as the axis about which the grating has to be rotated to adjust the wavelength.

A mirror which can be a plane mirror or a prism which is coated with a reflecting layer on one side can serve as a reflecting element. The mirror or the prism preferably simultaneously serves to deflect the beam from the dispersing plane. This is achieved preferably by inclining the mirror by a very small angle about an axis which is parallel to the dispersing plane and perpendicular to the beam incident on the mirror. Thereby the multiple-dispersion beam is deflected a little bit up or down and occurs shifted in height in the image plane where usually the detector is positioned relative to the single-dispersion beam.

Advantageously the reflecting element is arranged such that the angle between the normal of the dispersing element and the dispersed beam is smaller than the angel the incident beam. Thereby the parallel bundle of rays falling on the grating has a smaller diameter than the bundle falling on the reflecting element. The reflecting element, for example the plane mirror, is larger in this case than the collimating mirror which is generally more expensive. However, there may be arrangements, where the opposite arrangement is more advantageous.

Preferably there are means provided in the spectrometer for controlling the angle with which the incident beam falls on the dispersing element. These means can be formed by a step motor moving a lever effecting a rotation of the dispersing element.

Preferably there are also means provided for controlling the angle with which the dispersed beam leaves the dispersing element. Furthermore means are provided for controlling the positions of the components with a computer. The grating can be rotated without further modification of the spectrometer by the computer and thereby the wavelength and the amount of grating passages can be set.

In a preferred embodiment of the invention an entrance slit is provided and means by which the beam is deflectable in such way that the primary image of this entrance slit at a selected wavelength is shifted sideways relative to the entrance slit in the dispersion plane. This sideways shift can be achieved by simple rotation of the grating by a small angle. The dispersion plane generally is defined as the plane perpendicular to the grooves of the grating, if the dispersing element is a grating. If the dispersing element is a prism, the dispersing plane is the plane which is perpendicular to the roof edge of the prism.

In an alternative embodiment of the invention means are provided by which the beam is deflectable in such way that the primary image of this entrance slit at a selected wavelength is shifted upwards or downwards relative to the entrance slit in the dispersion plane. Such a deflection can be achieved by inclining one of the imaging elements, for example a mirror.

Preferably only reflecting optical components are provided in the spectrometer apart from the dispersing element. Chromatic image distortions can thereby be avoided and the spectrometer can be used in every wavelength range. An optical arrangement can be provided for the magnification of the primary image only in the direction of the dispersion plane, for example by two cylinder lenses, by which it is achieved that the resolution of the arrangement is not limited by the finite width of the detector elements.

According to the invention the light beam is directed onto a dispersing element by an imaging optical system and from the dispersing element back to the imaging optical system to measure the radiation from a spectral range with different spectral resolutions. The light beam can then be directed to a reflecting element by a change of the position of the dispersing element, i.e. by rotation, from which reflecting element is is directed back to the dispersing element.

The following method can be applied:
(a) positioning of the dispersing element such that the dispersed light beam of a selected wavelength is reflected into the incident light path
(b) measuring of the signal at the detector,
(c) positioning of the dispersing element such that the dispersed light beam of a selected wavelength is reflected towards the reflecting element, and
(d) measuring of the signal at the detector.

If after the second positioning the light of a reference light source is coupled into the spectrometer the larger inspection range with smaller resolution can be used to provide a wavelength calibration of the detector elements by means of a reference light source. The reference light source, for example a low pressure hollow cathode lamp, generally has substantially less intensity than a laser. If the radiation emitted by a line of the reference light source is distributed on too many detector elements a poor signal-to-noise ratio is obtained. In order to determine the peaks of the line or the center of the line a lower resolution can be sufficient. It therefore is obvious to measure in this case with a single passage at the grating.

However, the intensity is sufficient for the measuring of the line profile of a laser and the line can be distributed on many detector elements. Then the grating can be rotated in a suitable manner such that measurment is carried out with several passages at the grating. Of course it is possible to measure the reference radiation first.

The spectrometer is particularity suitable for the determining of the spectral characteristics of an excimer laser used for the photolitography. The spectral characteristics of the excimer laser can be used for its adjustment and automatic control. In photolitography the quality of the laser can be determined from the line profile of the used laser. For example, if the spectral half width value of a KrF excimer laser is larger than a threshold value the gas mixture has to be exchanged. Peak-to-peak variations of the laser pulse can also be observed and evaluated in order to pass only such pulses to the waver which fulfill certain criteria. With the spectrometer according to the invention a resolution can be achieved which allows the simultaneous measurment of a line profile and therefore the adjustment and automatic control of the litography process due to the spectral characteristics of the laser.

Further embodiments are subject matter of the subclaims. Some embodiments of the invention are described hereinbelow with reference to the accompanying drawings. In which is shown:

DETAILED DESCRIPTION OF THE PREFERRED EMBODIMENTS

Figure 1:
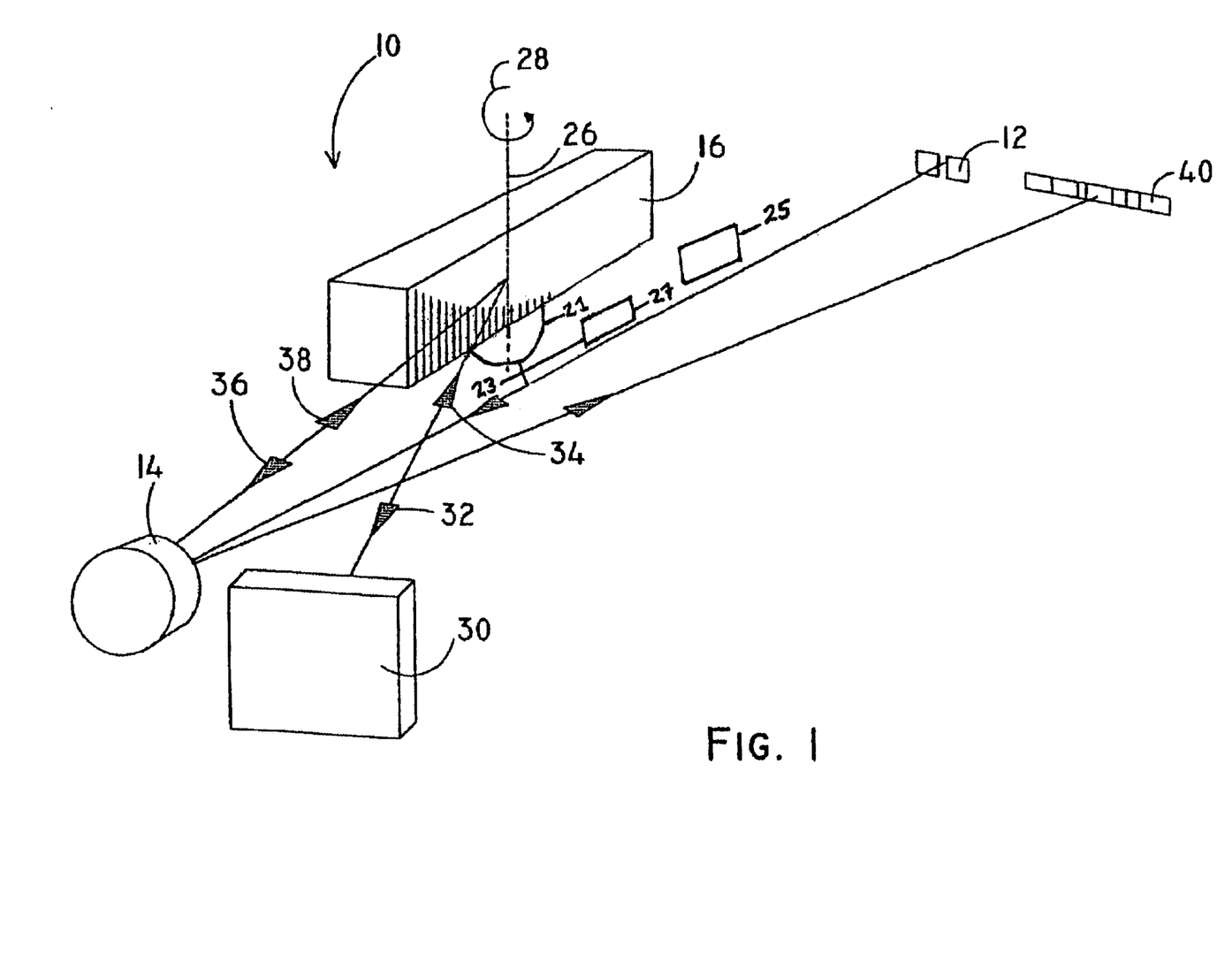
FIG. 1 the spectrometer according to the invention with double passage at the grating, sideways shifted exit slit and fixed mirror positions.

In FIG. 1 numeral 10 denotes a spectrometer. The light is coupled into the spectrometer 10 through an entrance slit 12. The divergent beam is collimated at an off-axis parabolic mirror 14 to a parallel bundle and directed to an Echelle-grating 16 with a large Blaze angle of at least 45 degrees.

Figure 2:
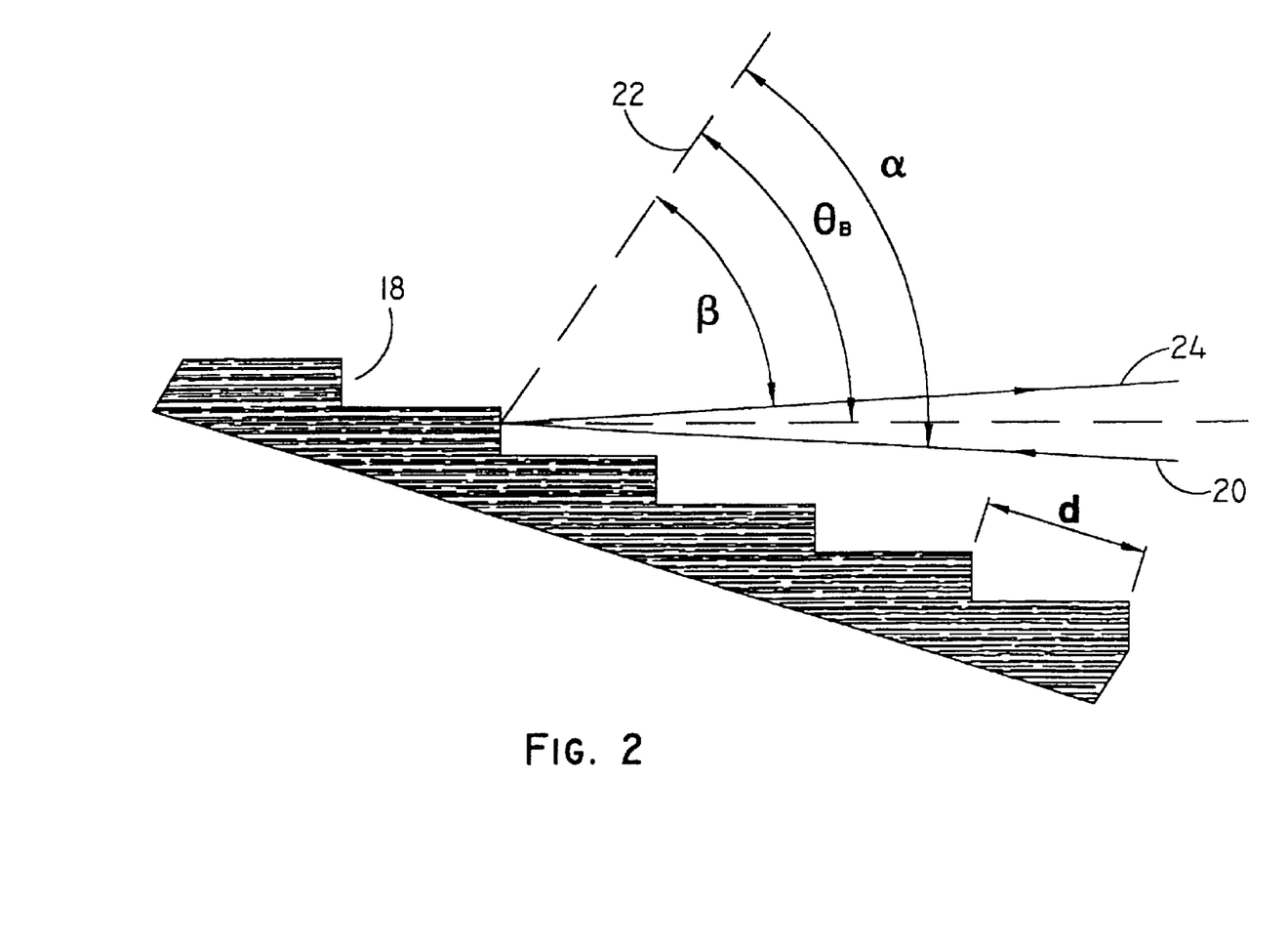
FIG. 2 the composition of an Echelle-grating.

An Echelle grating is shown again in detail in FIG. 2. The Echelle-grating comprises stair-like grooves. The grooves have the distance d, which corresponds to the grating-constant. The incident angle α is the angle between the incident beam 20 and the normal 22 of the grating 16. The incident angle β is the angle between the reflected beam 24 and the normal 22 of the grating 16. The Blaze-angle $\theta_B$ is the angle between the normal 22 of the grating 16 and the normal of the grating grooves 18.

The intensity of the diffraction image is concentrated in high diffraction orders in the range between the $80^{th}$ and $100^{th}$ order by the large Blaze angle. A high diffraction order causes a high resolution. Similarly a large diffraction angle causes a high resolution. The Echelle-grating has a high number of grooves of 50 to 100 grooves per milimeter to provide a large diffraction limited resolution. Due to the large incident angle the grating has to be accordingly long if the entire radiation shall meet the grating.

In FIG. 1 a rotational axis is denoted by numeral 26. The grating 16 is arranged such that it can be rotated about this axis 26, as is indicated by an arrow 28. The rotation can be achieved by mounting the grating on a turning table 21 which is connected to a lever 23. The lever can be moved from a computer 25 by means of step motors 27 and thereby effect a defined rotation. The wavelength to be measured or the wavelength range can be selected in a particularily simple way via the rotational angle.

The grating 16 is set such that the dispersed beam falls on a plane mirror 30 for the selected wavelength. This is indicated by an arrow 32. The plane mirror is mounted such that the reflected beam immediately returns to the incident path and meets the grating 16 once more. This is indicated by an arrow 34. In such way a double passage is effected by which an increased resolution can be obtained. With the set angle of the grating 16 the beam 38 returns again into the incident path. This is indicated by an arrow 36. The beam 38 does not completely return into the incident path but only as much as the dimensions of the entrance slit 12 allow to have a detector to be arranged next to it.

The beam is focussed again by the parabola 14 and directed right beside the entrance slit 12 where the spectrum is detectable in the exit plane 40 with a linear array of a detector. A CCD-linear detector can be used as a detector but any other linear detector or detector array is suitable which has a sufficient small pixel size.

Figure 3:
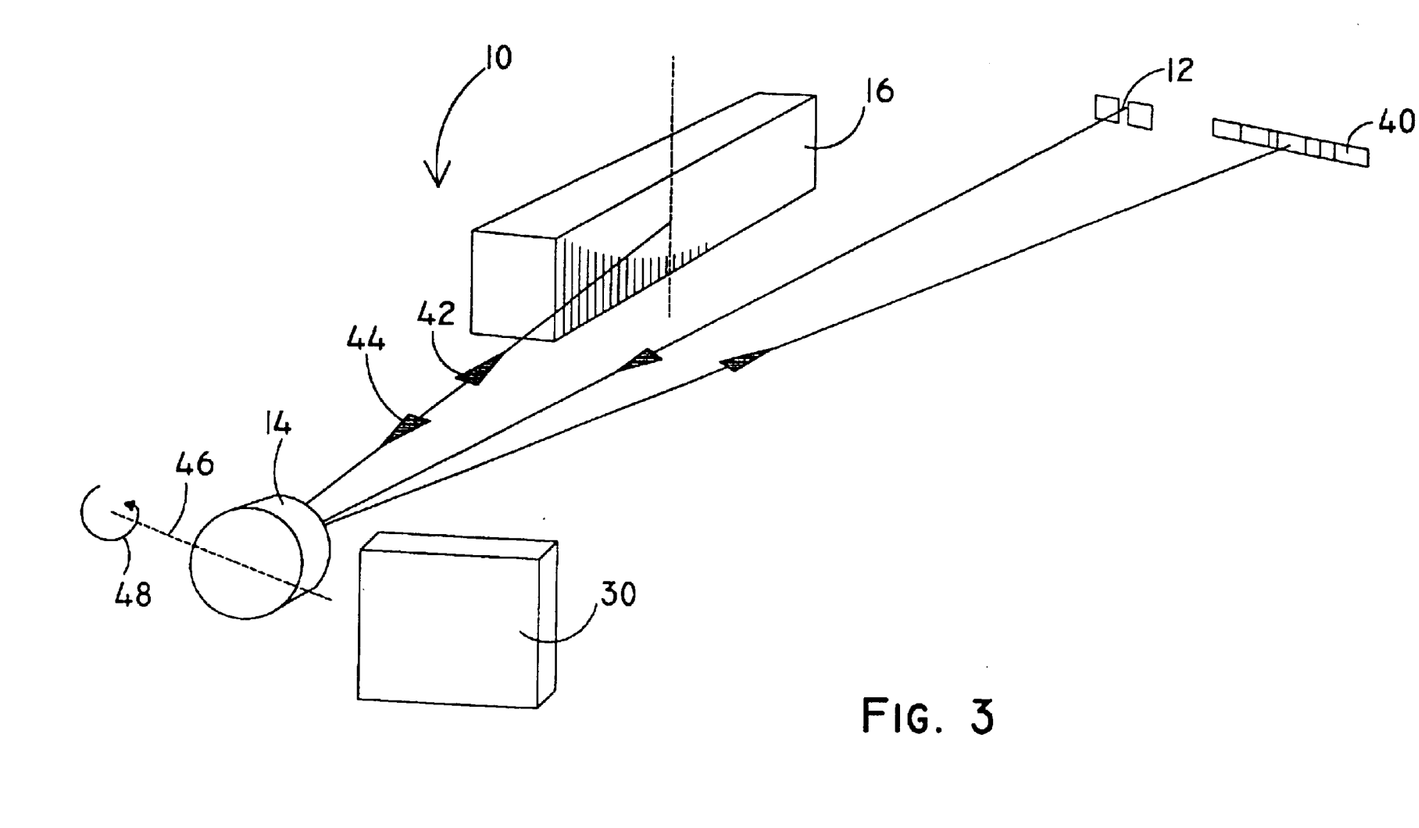
FIG. 3 the spectrometer according to the invention with double passage at the grating, inclinable parabolic mirror and sideways shifted exit slit.

In FIG. 3 the spectrometer 10 is shown with a modification. The grating 16 is arranged such that the dispersed beam represented by an arrow 44 is reflected immediately back into the incident path, i.e. into the incident beam represented by an arrow 42 and does not fall onto the mirror 30. Accordingly, the spectrometer 10 has a smaller spectral resolution than with a grating position where a double passage is effected.

Figure 4:
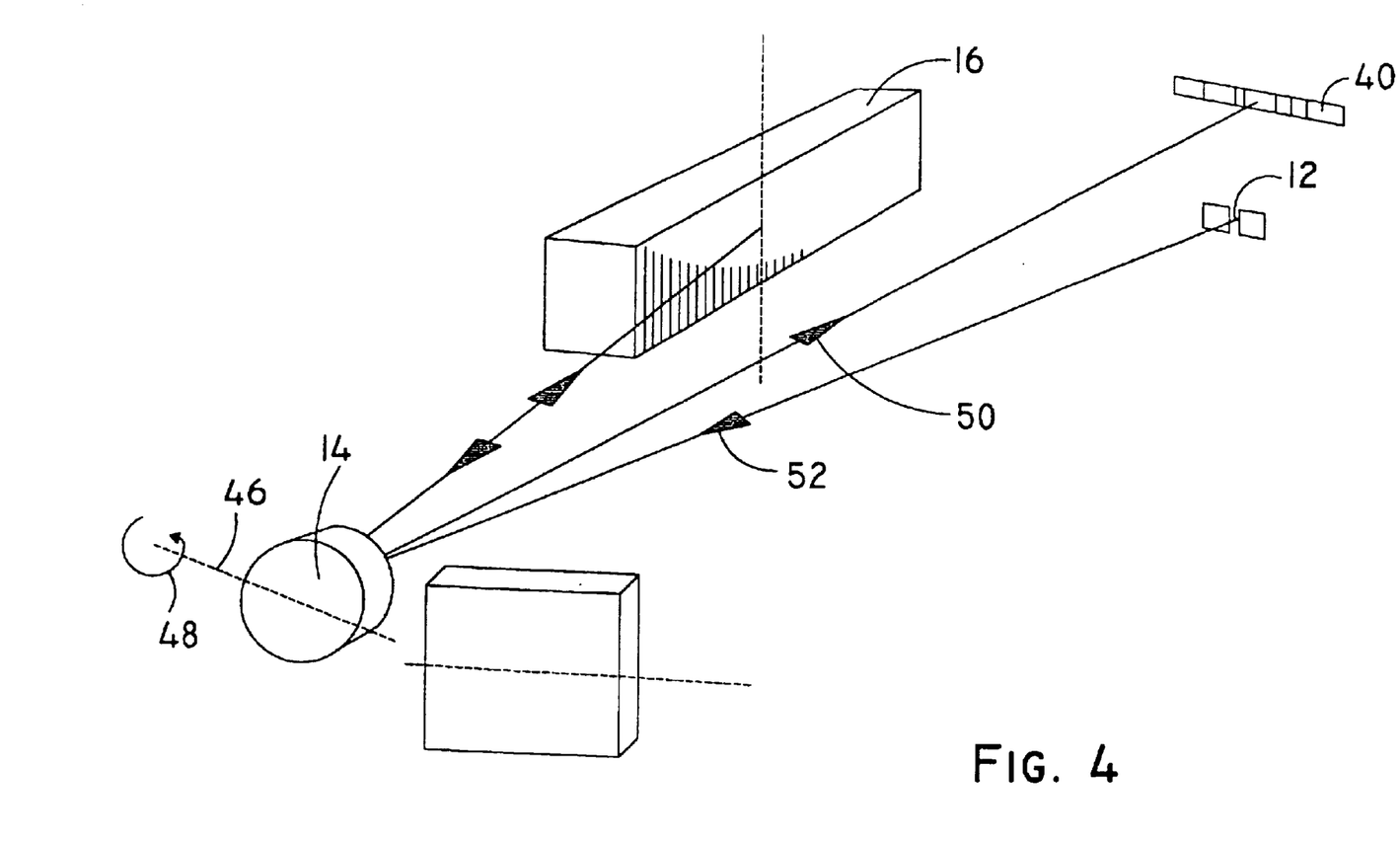
FIG. 4 the spectrometer according to the invention with single passage at the grating, and an exit slit which is shifted perpendicular to the dispersion plane.
Figure 5:
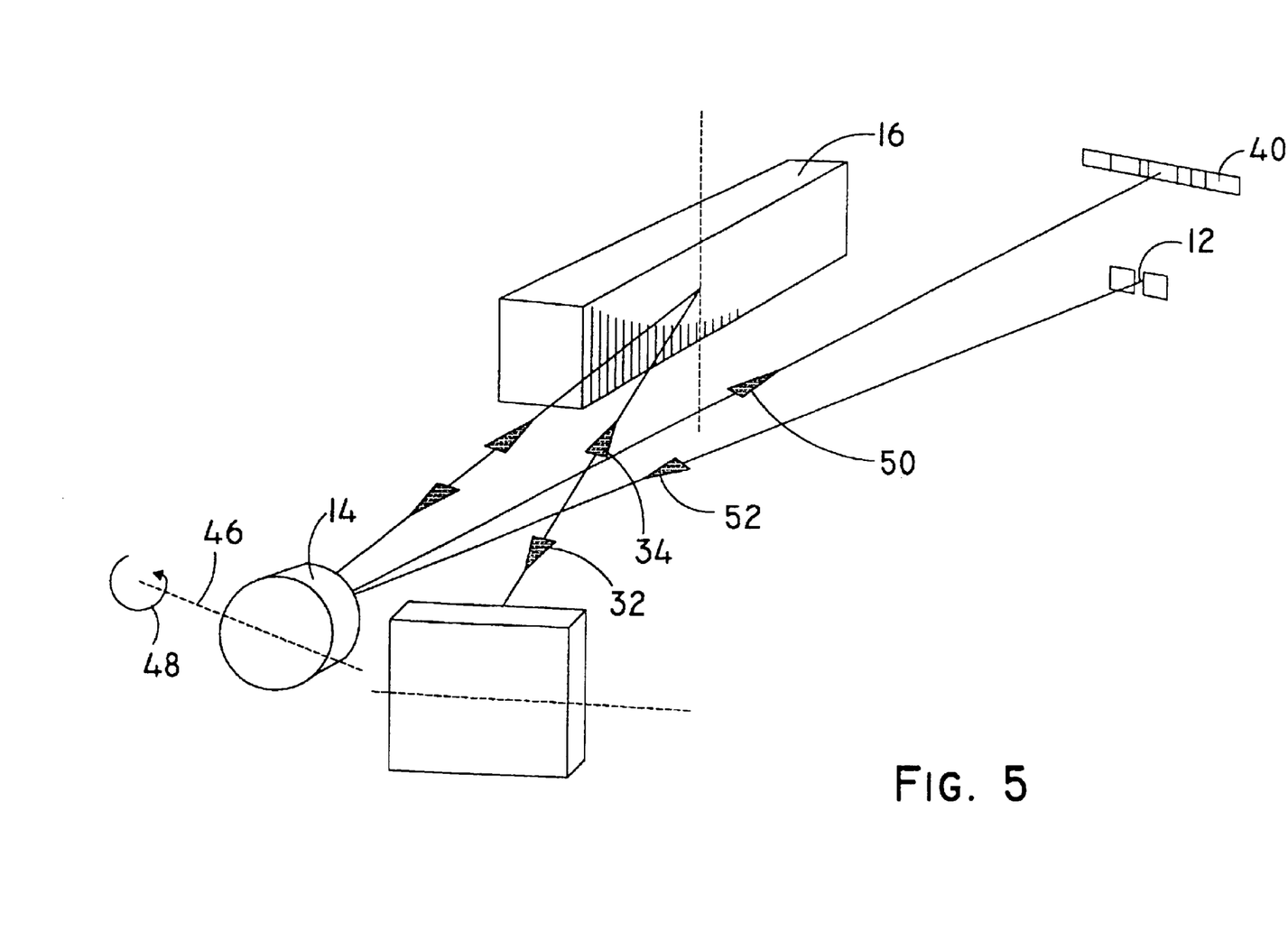
FIG. 5 the spectrometer according to the invention with double passage at the grating and an exit slit which is shifted perpendicular to the dispersion plane.

By rotating the parabolic mirror 14 about an axis 46 which is shown in FIG. 3 by an arrow 48 the beam can be shifted a little from the plane. Then the spectrum does not occur beside but over or under the entrance slit 12. This shift occurs with a single passage at the grating as shown in FIG. 4 and with a plural passage at the grating as shown in FIG. 5. The returning beam, represented by an arrow 50 runs over the incident beam, represented by an arrow 52.

There are grating positions in which the respective wavelength in one order directly returns to the parabolic mirror 14 and in another order just to the mirror 30. The latter will be reflected in the above described manner and pass the grating again. Then two different signals from different orders can be found in the image plane of the primary image 40. At least one of the signals is not desired.

Figure 6:
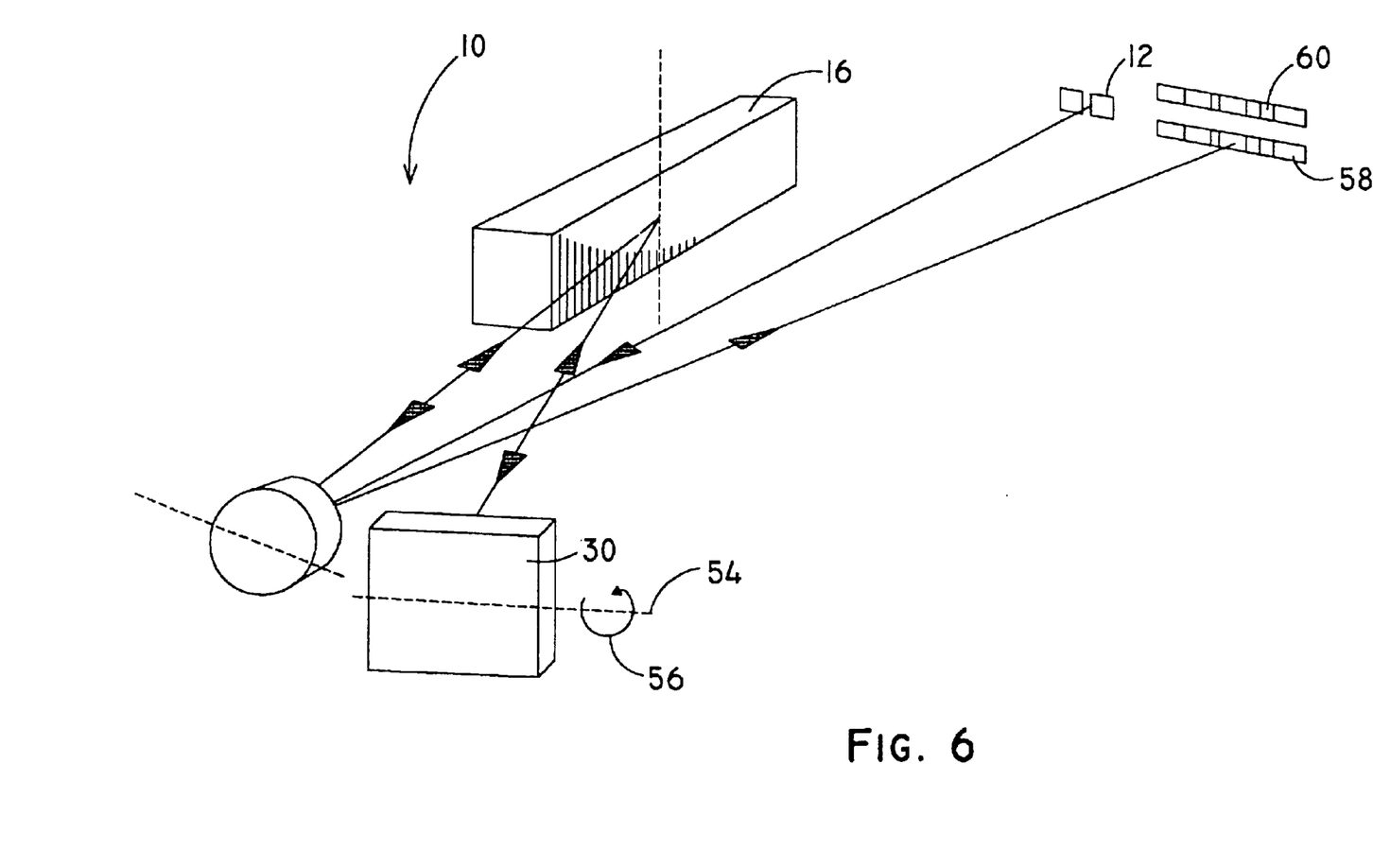
FIG. 6 the spectrometer according to the invention with an inclined reflector.

This problem can be solved by inclining the mirror 30 about an axis 54 which is parallel to the dispersion plane and perpendicular to the incident beam. The inclination angle can be very small. Thereby generated image distortions will be kept small. It must be sufficiently large that the image 58 of the entrance slit 12 in the primary image plane of the multiple-dispersion beam is positioned over or under the image 60 of the entrance slit 12 with a single-dispersion beam. In FIG. 6 the image 58 of the multiple-dispersion beam is positioned underneath the image 60 of the single-dispersion beam.

Instead of an inclined plane mirror 30 a Littrow-Prisma (not shown) which is arranged in a suitable manner is suitable. The light beam is diffracted a little out of the dispersion plane of the grating 16 by the prism with a correspondingly small prism angle which is coated on one side with a reflecting layer. The image 58 or 60, respectively, of the entrance slit 12 is then also shifted in the exit plane at the detector.

Figure 7:
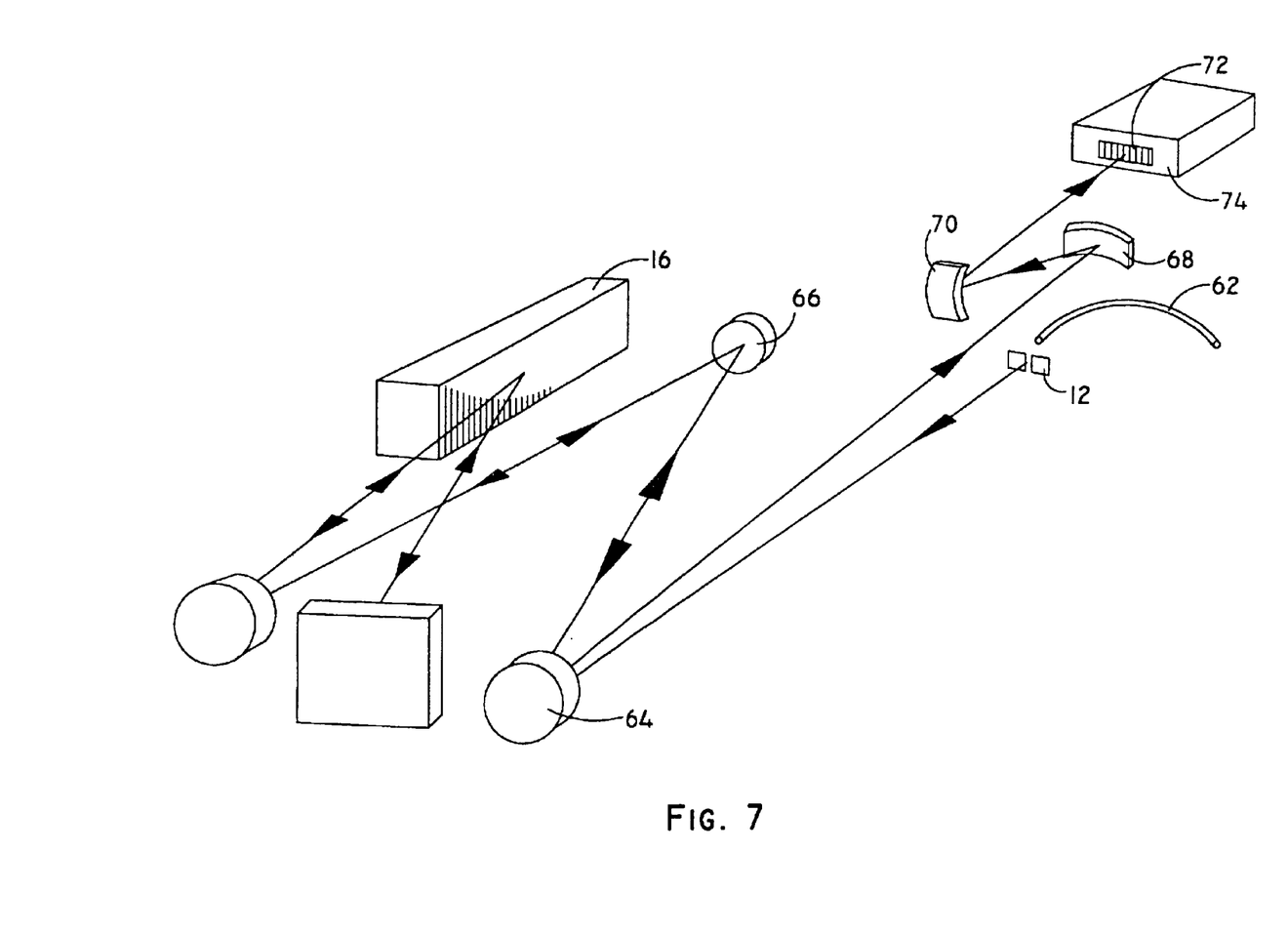
FIG. 7 the spectrometer according to the invention with reduced exterior dimensions and an optical magnification arrangement.

In FIG. 7 a spectrometer according to the invention is shown, in which the exterior dimensions are reduced. The light is lead through the entrance slit by means of a fiber 62. Thereby the light source can be positioned at any location. Plane mirror 64 and 66 effect a folding of the light path. In the same way the light path is folded by means of cylinder mirrors 68 and 70. The cylindrical form causes a magnification of the image in the direction of the dispersion while the dimensions of the image perpendicular to the direction of the dispersion remain the same. The peak is then distributed on more picture elements of the detector and the picture elements will not any longer be limiting for the resolution.

Figure 8:
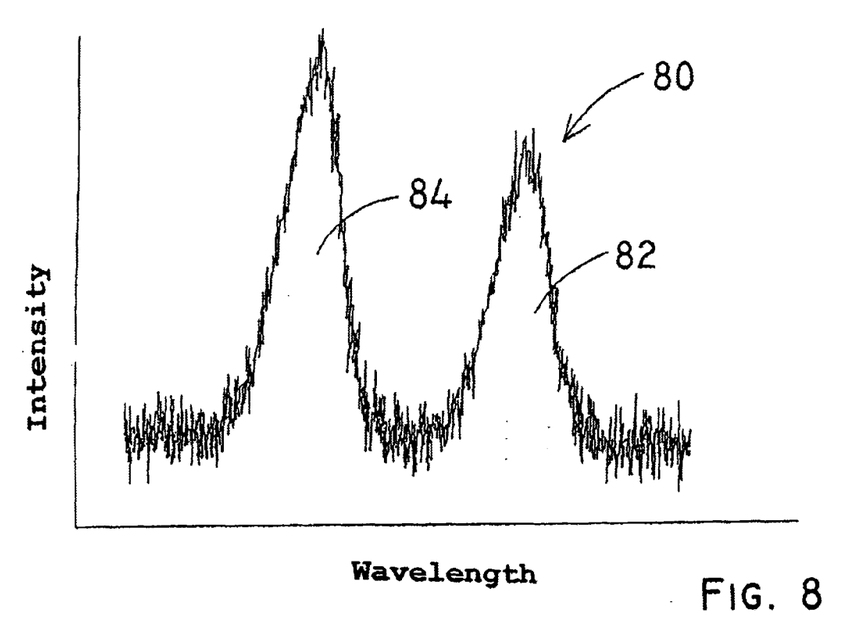
FIG. 8 a detector signal of a completely resolved doublett with double passage at the grating.

In the described arrangement two different measurements with different resolution and different intensity at a detector element can be carried out without any further modifications. In the first position of the grating the beam is dispersed twice and only then returns to the detector 74. Thereby a higher resolution is achieved and the intensity of the light is distributed on many detector elements. This set-up is suitable especially for measuring line profiles of light sources with a high intensity, such as laser light sources. A signal 80 obtained with such a set-up is shown in FIG. 8. Two explicitely seperated peaks 82 and 84 can be seen.

In the second position of the grating the single-dispersion beam directly returns to the detector 74. A slightly smaller resolution is obtained and the light is distributed on less detector elements 72. The signal-to-noise ratio at each detector element is increased. This set-up is especially suitable for measuring the emission spectrum of light sources with poor intensity such as low pressure hollow cathode lamps. In this case it might not be possible to resolve the line profile of the emission peak completely but the resolution is still sufficient to determine the line center or the maximum of intensity.

Figure 9:
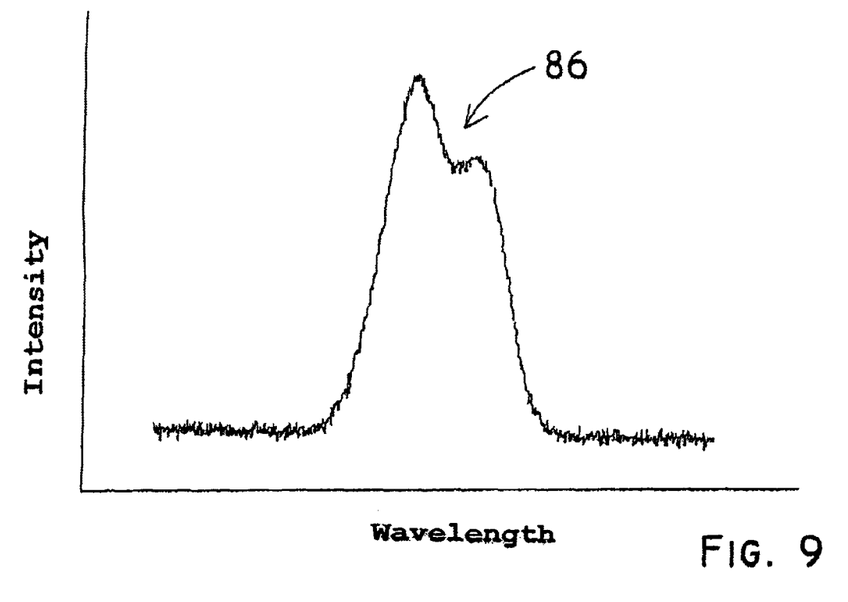
FIG. 9 a detector signal of the not completely resolved doublett of FIG. 8 with single passage at the grating.

A signal 86 obtained with such a set-up with the same light source as in FIG. 8 is shown in FIG. 9. A doublett can be seen on a clearly reduced background noise. The smaller noise is due to the distribution of the same intensity on less detector elements because of the lower resolution and also because there are no reflection losses at the mirror and especially at the grating. The signal is sufficient to determine a line center with a good accuracy.

The combination of the two measurements described above have special advantages: with the high resolution the line profile can be measured. With the low resolution the wavelength of a reference light source, such as a hollow cathode lamp can be determined and in such way a wavelength calibration of the detector elements can be carried out.

The position of the grating can be determined relative to the position of the off-axis parabolic mirror by means of a computer. The grating 16 can be rotatably mounted and rotated by means of a lever with a step motor. In such way even very small changes of an angle can be achieved with sufficient accuracy. In a similar way the positioning of the parabolic mirror can be carried out.

What is claimed is:

1. A spectrometer comprising
   a light source of a selected wavelength,
   an echelle-grating for dispersing radiation incident thereon in a dispersion plane,
   means for directing a light beam from said light source in an incident path of rays onto said echelle-grating to be dispersed thereby,
   means for moving said echelle-grating into a first position and a second position, said first position being selected to return said light beam after one single dispersing passage over said echelle-grating as a single-dispersion light beam into said incident path of rays,
   reflecting means for receiving a dispersed light beam from said echelle-grating, when said echelle-grating is in its second position, and for directing said dispersed light beam onto said echelle-grating for a selected number of further dispersing passages to provide a multiple-dispersion light beam, said echelle-grating, in its second position, being arranged to return said multiple-dispersion light beam into a direction the projection of which on said dispersion plane lays in the reverse direction of said incident path of rays,
   and further comprising
      means for deviating at least one of said beams from said dispersion plane, whereby said returned light beams extend in different planes.

2. Spectrometer according to claim 1, wherein the means for deviating one of said beams is a mirror which is inclined about an axis which is parallel to the dispersion plane and perpendicular to the incident beam.

3. Spectrometer according to claim 1, wherein said echelle-grating has a Blaze angle ($\theta_B$), said Blaze angle being at least 45°.

4. Spectrometer according to claim 1, wherein said reflecting means is a mirror.

5. Spectrometer according to claim 4, wherein said mirror for receiving a dispersed light beam also forms the means for deviating said beam from the dispersion plane.

6. Spectrometer according to claim 5, wherein said mirror is a plane mirror.

7. Spectrometer according to claim 1, wherein the normal of the echelle-grating and the dispersed beam form a first angle $\beta$, and wherein the normal of the echelle-grating and said incident path form a second angle $\alpha$, said first angle $\beta$ being smaller than said second angle $\alpha$.

8. Spectrometer according to claim 1, wherein the normal of the echelle-grating and the dispersed beam form a first angle $\beta$, and wherein the normal of the echelle-grating and said incident path form a second angle $\alpha$, said first angle $\beta$ being larger than said second angle $\alpha$.

9. Spectrometer according to claim 1, wherein a step motor and a lever are provided, said lever being connected to said echelle-grating, said step motor moving said lever and thereby effecting a rotation of said echelle-grating for controlling the angle between said radiation on said incident path and said echelle-grating.

10. Spectrometer according to claim 9, wherein a computer is provided and means for controlling the positions of said echelle-grating with said computer.

11. Spectrometer according to claim 1, comprising an entrance slit and imaging means for forming a primary image of said entrance slit and further comprising means by which said radiation is deflectable in such way that the primary image at said selected wavelength is shifted sideways relative to the entrance slit in said dispersion plane.

12. Spectrometer according to claim 11, wherein an optical arrangement is provided for the magnification of said primary image.

13. Spectrometer according to claim 12, wherein said optical arrangement is formed by two cylinder lenses or cylinder mirrors.

14. Spectrometer according to claim 1, wherein in the spectrometer only reflecting optical components are provided apart from said echelle-grating.

15. Method for measuring the radiation from a spectral range with different spectral resolutions with a spectrometer comprising an echelle-grating, an imaging optical system, reflecting means and a detector wherein a light beam is generated which is directed onto said echelle-grating by said imaging optical system and from said echelle-grating back to said imaging optical system, and wherein the light beam is directed to said reflecting means by a change of the position of the echelle-grating, from which reflecting element is directed back to said echelle-grating.

16. Method according to claim 15, wherein the change of position of the echelle-grating is effected by a rotation.

17. Method according to claim 15, comprising the steps:
   (a) generating of a incident light path,
   (b) positioning of said echelle-grating
   (c) generating of a dispersed light beam of a selected wavelength and reflecting said light beam into the incident light path
   (d) measuring of the signal at the detector,
   (e) positioning of the echelle-grating such that the dispersed light beam of the selected wavelength is reflected towards the reflecting means, and
   (f) measuring of the signal at the detector.

18. Method according to claim 17, wherein a reference light source is provided and after the second positioning the light of a reference light source is coupled into the spectrometer.

19. Use of a spectrometer according to claim 1 for the determining of the spectral characteristics of an excimer laser used for the photolitography.

20. Use of a spectrometer according to claim 19, wherein the spectral characteristics of the excimer laser are used for its adjustment and automatic control.

* * * * *